US006581502B1

(12) United States Patent
Ryan

(10) Patent No.: US 6,581,502 B1

(45) Date of Patent: Jun. 24, 2003

(54) MITER BOX

(76) Inventor: Richard P. Ryan, 6584 Camden Ave., San Jose, CA (US) 95120

( * ) Notice: Subject to any disclaimer, the term of this patent is extended or adjusted under 35 U.S.C. 154(b) by 34 days.

(21) Appl. No.: 10/020,777

(22) Filed: Dec. 14, 2001

(51) Int. Cl.[7] ................................................ B23D 49/04

(52) U.S. Cl. ............................. 83/763; 83/766; 83/581

(58) Field of Search .......................... 83/766, 581, 765, 83/763, 827, 829, 820, 823

(56) References Cited

U.S. PATENT DOCUMENTS

| | | | | | |
|---|---|---|---|---|---|
| 759,647 | A | * | 5/1904 | Updegraff | 83/766 |
| 760,090 | A | * | 5/1904 | Venable | 83/766 |
| 868,634 | A | | 8/1907 | Bender | 83/766 |
| 996,146 | A | | 7/1911 | Schuring | 83/766 |
| 1,030,474 | A | | 6/1912 | Macey | 83/766 |
| 1,123,235 | A | * | 1/1915 | Brown | 83/766 |
| 1,187,335 | A | | 6/1916 | Kinley | 83/766 |
| 1,222,514 | A | | 4/1917 | Abramson | 83/766 |
| 1,653,386 | A | * | 12/1927 | Beyland | 83/766 |
| 1,910,383 | A | * | 5/1933 | Eitnear | 83/766 |
| 2,205,095 | A | | 6/1940 | Jacobsen | 83/766 |
| 3,822,471 | A | | 7/1974 | Crowl | 30/92 |
| 4,608,900 | A | | 9/1986 | Guiu et al. | 83/766 |
| 5,050,473 | A | | 9/1991 | Ingram | 83/454 |
| 5,179,781 | A | | 1/1993 | Weaver | 30/92 |
| 5,806,187 | A | | 9/1998 | Ducret | 30/92 |
| 6,205,897 | B1 | | 3/2001 | Carter | 83/54 |

* cited by examiner

*Primary Examiner*—Kenneth E. Peterson

(57) ABSTRACT

A saw blade guide which can be attached directly to work piece and will guide a reciprocating blade or band saw blade at a predetermined angle through the work piece.

5 Claims, 4 Drawing Sheets

MITER BOX

BACKGROUND OF THE INVENTION

1. Field of the Invention

The present invention relates to a miter box, and more particularly, to a portable miter box specially designed for limited access and adapted for use with band saws and reciprocating saws.

2. Description of the Prior Art

On construction sites the reciprocating saw is one of the most commonly used saws but it's mainly suitable for demolition work because of its ability to reach into small places and its inability to make accurate cuts. When the work piece is out of position unfortunately this may be the only saw that will work. This will lead to additional work. The craftsmen must sand, grind or even do additional welding to correct the inaccurate cut.

Craftsmen have tried to alleviate this problem through the use of miter boxes but problems with the prior miter boxes is inability to withstand the heavy forces of a reciprocal saw and still remain portable and compact enough to allow cutting of a work piece that is out of position.

The object and feature of the present invention is to provide a miter box were the cutting edge of a saw blade is supported throughout the cut and a plurality of saw guides are of sufficient width that said saw guides will support the wavy set tooth design of some metal cutting reciprocating saw blades. Providing side support to said saw blade's teeth, will increase the accuracy of the cut. Said saw guides of the present invention are also adjustable. Loosening the threaded bolts which hold said saw guides in place, will allow said saw guides to be angled towards each other to allow greater accuracy at the start of the cut or away from each other to allow for the cutting of a larger work piece.

It is a further object and feature of the present invention to provide a shim plate that is easily replaced, so it may be closely matched to the Kerf of the saw blade used in association with said present invention. This will allow a single miter box to be used universally with most saw blades.

It is still a further object and feature of the present invention to provide a miter box with a table in which a work piece may be clamped. The table is connected to the saw guides of the miter box with a locking friction type hinge. By using said locking friction type hinge just the right amount of friction can be applied so as said table will stay in position prior to locking said locking friction hinge. The said table can be pivoted up and down and be locked in place by tightening the threaded hinge pin. This allows virtually all, angled cuts to be achieved. The use of said locking friction type hinge also allows the miter box to be used in a relatively small space.

It is still a further object and feature of the present invention to provide a miter box with a scale on the outside portion of the miter box guide so as all angles of the table can be properly gauged. When an hex like wrench is inserted through a hole in said table and pressed against said scale the said table could be set to the anticipated angle.

It is still a further object and feature of the present invention to provide a miter box that will include a holster for storage of an hex like wrench making the present invention convenient and simple to use.

The saw blade guide is comprised of a pair of parallel saw guides with sufficient width that even saws with the wavy set teeth remained centered throughout the cut. Said parallel saw guides are spaced to accommodate a saw blade and an opposing pair of parallel saw guides also spaced to accommodate a saw blade. A single horizontal spacer bar closely matching the kerf of the saw blade to be used, is inserted at the base of, and in between both said parallel saw guides. A horizontal back plate and a horizontal front plate, through the use of threaded bolts, compresses all said parallel saw guides and said horizontal spacer bar to hold said parallel saw guides in place. A table is hinged perpendicular and slightly above the horizontal front plate. The hinge is a series of plates with a threaded hinge pin. When said threaded hinge pin is tightened, it compresses the hinge plates, holding the table in place. A scale has been included on one of said saw guides so when an hex like wrench is inserted through a hole in the table and pressed against the scale said table can be adjusted to the correct angle.

Miter box are well known and well developed in the prior art. The prior art discloses constructions, which ranged from the very simple, including a true slotted box construction, from which the named derides, to a very complex, including a sophisticated locating, alignment and clamping device.

Miter boxes of various types are utilized throughout the prior art to provide for alignment and securement of the work piece during the cutting process. Typically such miter boxes are designed for use with hand saws and are not suitable for efficient use in cutting materials such as solid steel. These apparatus are exemplified by U.S. Pat. No. 5,050,473 to Ingram, U.S. Pat. No. 2,205,095 to Jacobsen, U.S. Pat. No. 1,222,514 to Abramson, U.S. Pat. No. 1,187,335 to Kinley, U.S. Pat. No. 1,030,474 to Macey, U.S. Pat. No. 996,149 to Schuring, U.S. Pat. No. 868,634 to Bender. More recent prior art have attempted to build a miter box that holds the cutting edge of a saw blade throughout the cut such as U.S. Pat. No. 4,608,900 to Guiubut, the but the guides are difficult to a line or U.S. Pat. No. 5,179,781 to Weaver with the guides are not adjustable. In an addition U.S. Pat. No. 4,608,900 to Guiubut, and U.S. Pat. No. 5,179,781 to Weaver would require additional miter boxes for each different saw blade thickness or tooth set in order to maintain contact with the saw blades cutting edge throughout the cut.

OBJECTS AND ADVANTAGES

Accordingly, besides the objections and advantages of the saw blade guide described in my above patent, several objects and advantages of the present invention are:

(a) To provide a miter box so portable that it can position into limited access working areas.
(b) To provide a miter box with unlimited angle adjustment within a specified range.
(c) To provide a miter box with saw guides capable of adjusting to virtually every saw blade width and tooth set available.
(d) To provide a miter box with saw guides that guide a saw blade's cutting edge all the way through the work piece that is cut.
(e) To provide a miter box with saw guides with sufficient width that even saw blades with the wavy set teeth remaine centered throughout the cut.
(f) To provide a miter box strong enough to withstand the impacts of a reciprocating saw.
(g) To provide a miter box with a built in scale so as to set the table at a predetermined angle.
(h) To provide a miter box that will store the tool required for its use.
(i) To provide a miter box with saw guides that may be angled towards the workpiece to improve accuracy.

SUMMARY OF THE INVENTION

In accordance with the present invention a miter box comprising of a table attached to a series of adjustable saw guides, through the use of a locking friction hinge. Said miter box also incorporates a scale. Said scale then can be used by removing an hex like wrench that is holstered to the base of said miter box. Then by inserting said hex like wrench through a hole in the said table and by leaning the other end of said hex like wrench against said scale, a reading can be made of said tables angle.

BRIEF DESCRIPTION OF THE DRAWINGS

Drawings

The invention will be better understood and the above objects as well as objects other than those set forth above will become more apparent after a study of the following detailed descriptions thereof. Such descriptions make reference to the annexed drawings wherein.

REFERENCE NUMERALS AND DRAWINGS

Figure 1:
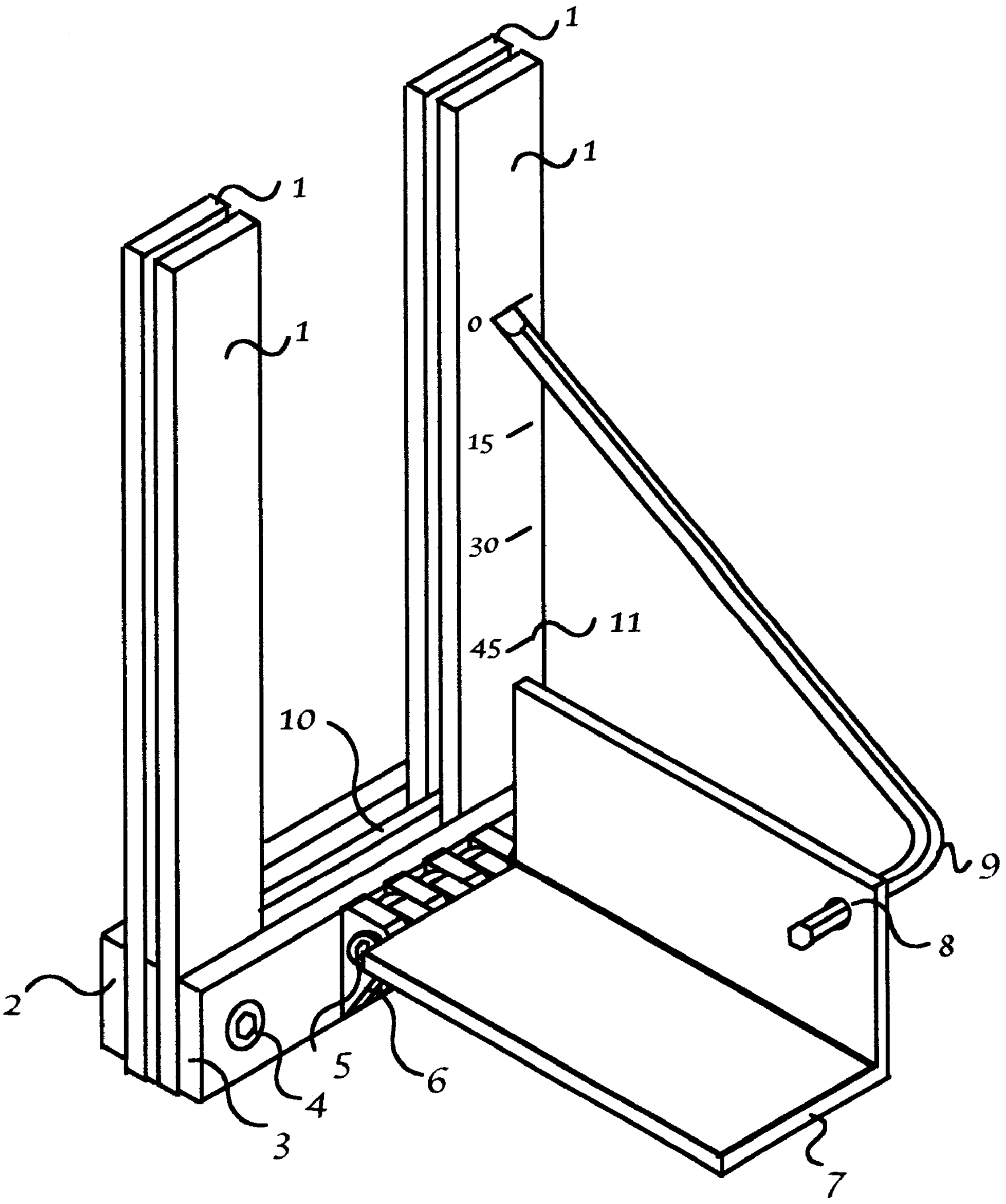
FIG. 1 is isometric view of the present invention with table set at zero degrees.
Figure 2:
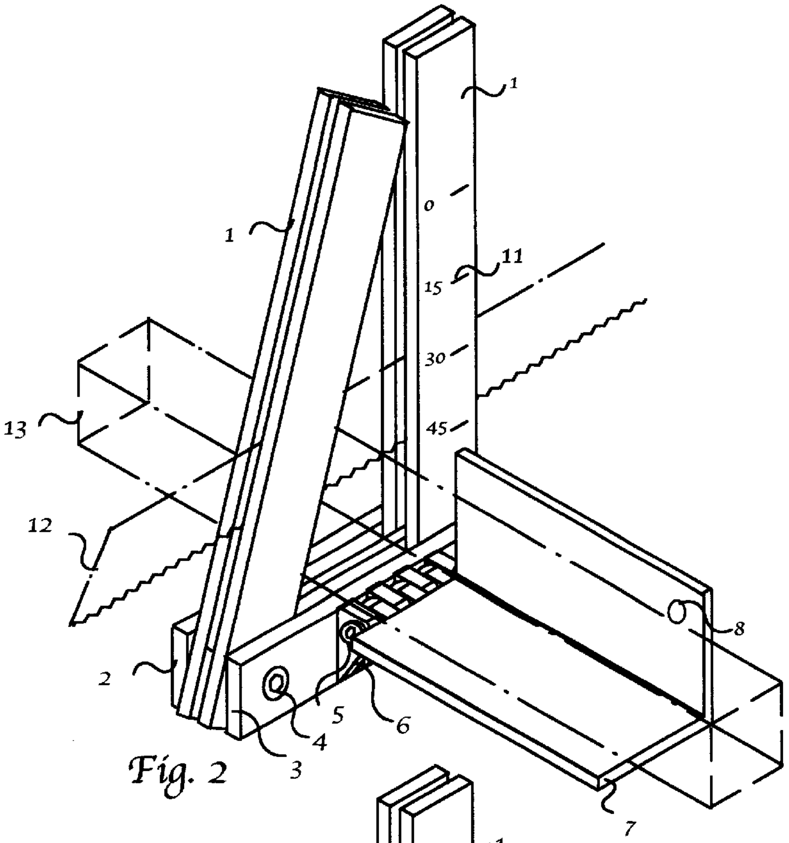
FIG. 2 is isometric view of the present invention with saw and small work piece.
Figure 3:
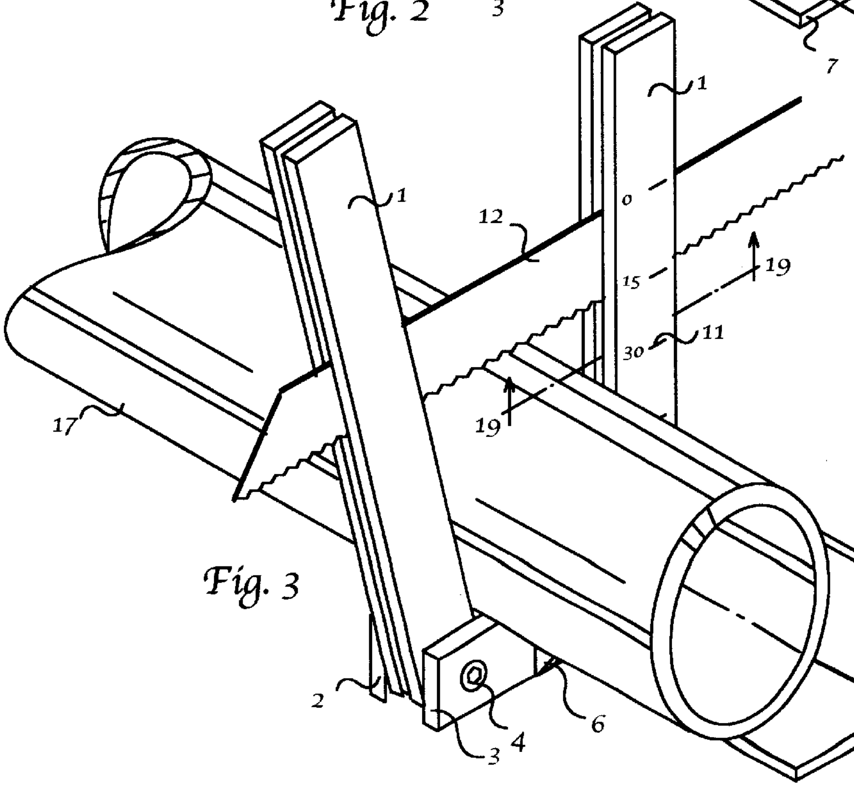
FIG. 3 is isometric view of the present invention with saw and large work piece.
Figure 4:
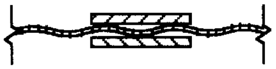
FIG. 4 is a cross sectional view of saw guides, guiding a saw with a wavy set tooth saw blade taken along lines 19—19 of FIG. 3.
Figure 5:
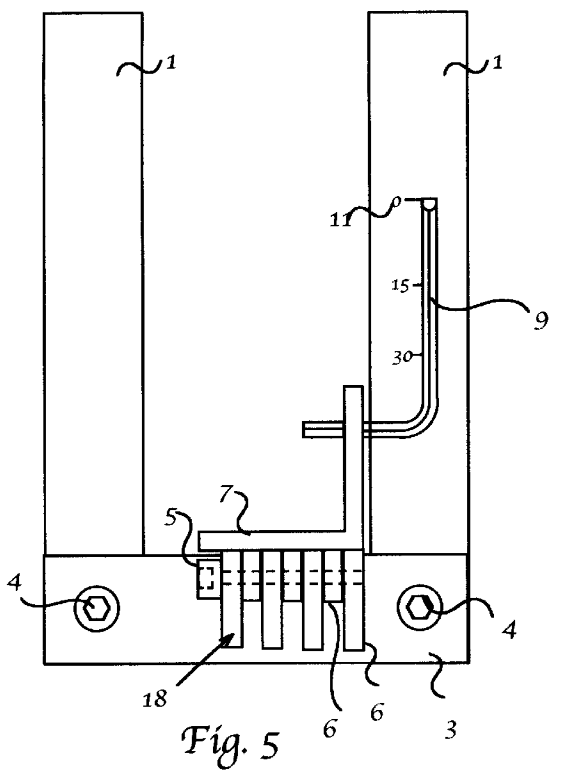
FIG. 5 is plan view of the present invention with table set at zero degrees.
Figure 6:
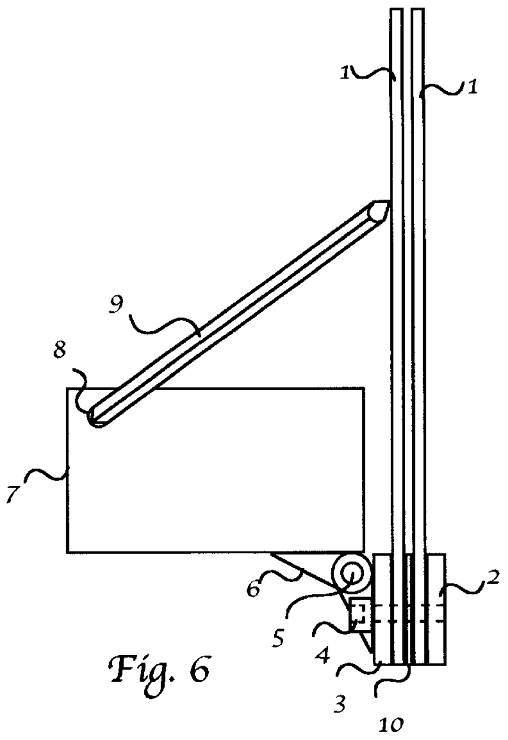
FIG. 6 is side view of the present invention with table set at zero degrees.
Figure 7:
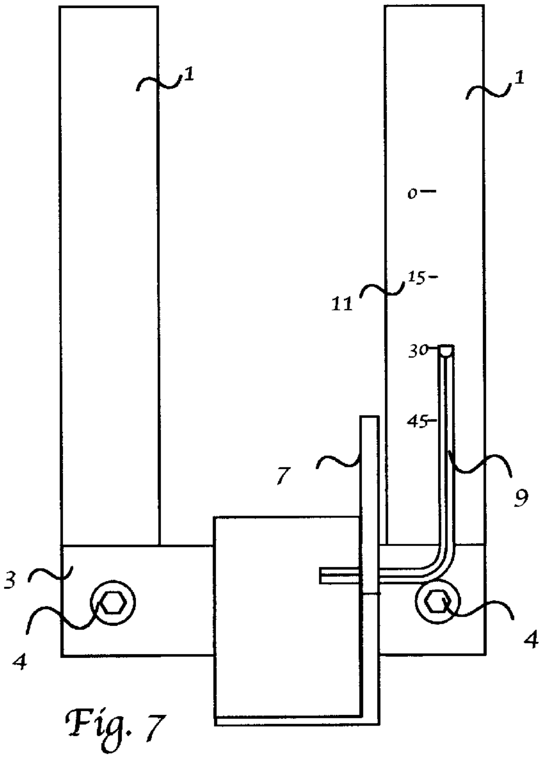
FIG. 7 is plan view of the present invention with table set at 30 degrees.
Figure 8:
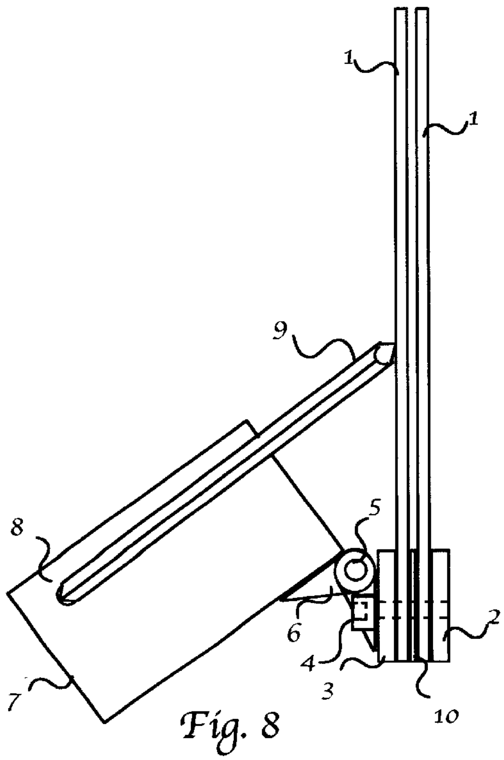
FIG. 8 is side view of the present invention with table set at 30 degrees.
Figure 9:
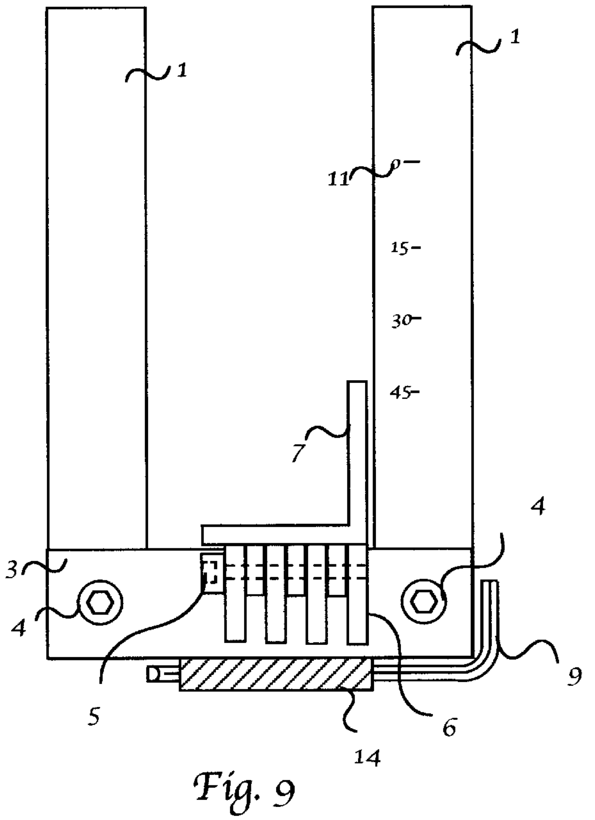
FIG. 9 is plan view of the present invention with hex like wrench holster.
Figure 10:
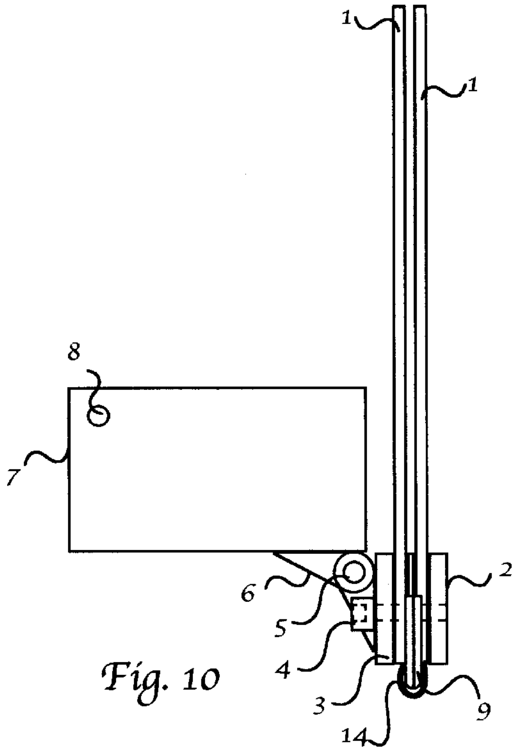
FIG. 10 is side view of the present invention with hex like wrench holster.
Figure 11:
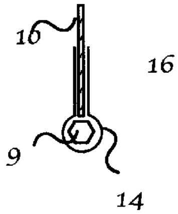
FIG. 11 is side view of the hex like wrench in holster attached to Horizontal spacer bar.
Figure 12:
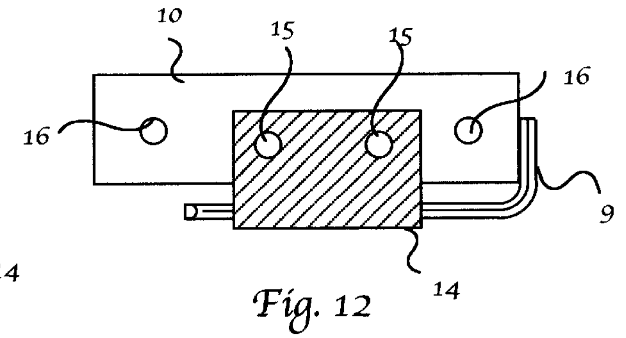
FIG. 12 is plan view of the hex like wrench in holster attached to Horizontal spacer bar.
Figure 13:
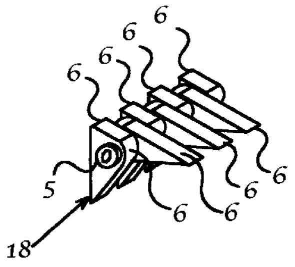
FIG. 13 is isometric view of the locking friction hinge assembly.

1. Parallel saw guides
2. Horizontal back plate
3. Horizontal front plate
4. Threaded bolts
5. Threaded hinge pin
6. Hinge plate
7. Table
8. Hole in table
9. Hex like wrench
10. Horizontal spacer bar
11. Scale
12. Saw blade
13. Work piece
14. Holster
15. Rivet
16. Hole in horizontal spacer bar
17. Large work piece
18. Locking friction hinge

DESCRIPTION OF THE PREFERRED EMBODIMENT

Description FIG. 1. Preferred Embodiment

A preferred embodiment of the closure of the present invention is illustrated in FIG. 1. A pair of parallel saw guides 1 made of hard or harden material, spaced to accommodate a saw blade 12 and an opposing pair of parallel saw guides 1 also spaced to accommodate a saw blade 12. A single horizontal spacer bar 10 is inserted at the base of and in between both parallel saw guide 1. A horizontal back plate 2 and a horizontal front plate 3 through the use of threaded bolt 4 compresses all parallel saw guides 1 and horizontal spacer bar 10 to hold the parallel saw guides 1 in place. A table 7 is hinged perpendicular and slightly above the horizontal front plate 3. The locking friction hinge 18 is a series of plates 6 with a threaded hinge pin 5. When the threaded hinge pin 5 is tightened, it compresses the hinge plates 6, holding the table 7 in place. A scale 11 as been included on one of parallel saw guides 1 so when an hex like wrench 9 is inserted through a hole in the table 8 and pressed against the scale, the table 11 can be adjusted to the correct angle.

What is claimed as being built and desired to be protected by Letters Patent of the United States is as follows:

1. A miter box for use in conjunction with a saw blade, said miter box comprising:

- a table having a defined abutment point,
- a plurality of spaced saw guides defining a gap therebetween for guiding said saw blade,
- a locking friction hinge joining said table and said plurality of spaced saw guides, said locking friction hinge having a rotatable head for locking said hinge,
- a scale on one of said plurality of spaced saw guides, said scale having markings for the angular orientation of said plurality of saw guides relative to said table,
- a tool for rotating said rotatable head to lock or unlock said hinge, said tool having a specific length, wherein when a first end of said tool is positioned against said abutment point and a second end of said tool is positioned against said scale, said second end of said tool contacts a marking that indicates the angular orientation of said plurality of saw guides relative to said table.

2. A miter box as set forth in claim 1, wherein said tool is a hex wrench.

3. A miter box as set forth in claim 2, further including a holster for storing said hex wrench.

4. A miter box as set forth in claim 3, further comprising a removable shim plate located between said saw guides to define said gap.

5. A miter box as set forth in claim 4, wherein said defined abutment point is a hole in said table.

* * * * *